Dec. 7, 1954  J. W. HOLLAND  2,696,243
METHOD AND APPARATUS FOR MAKING SCRIM
Filed Feb. 19, 1951  3 Sheets-Sheet 1
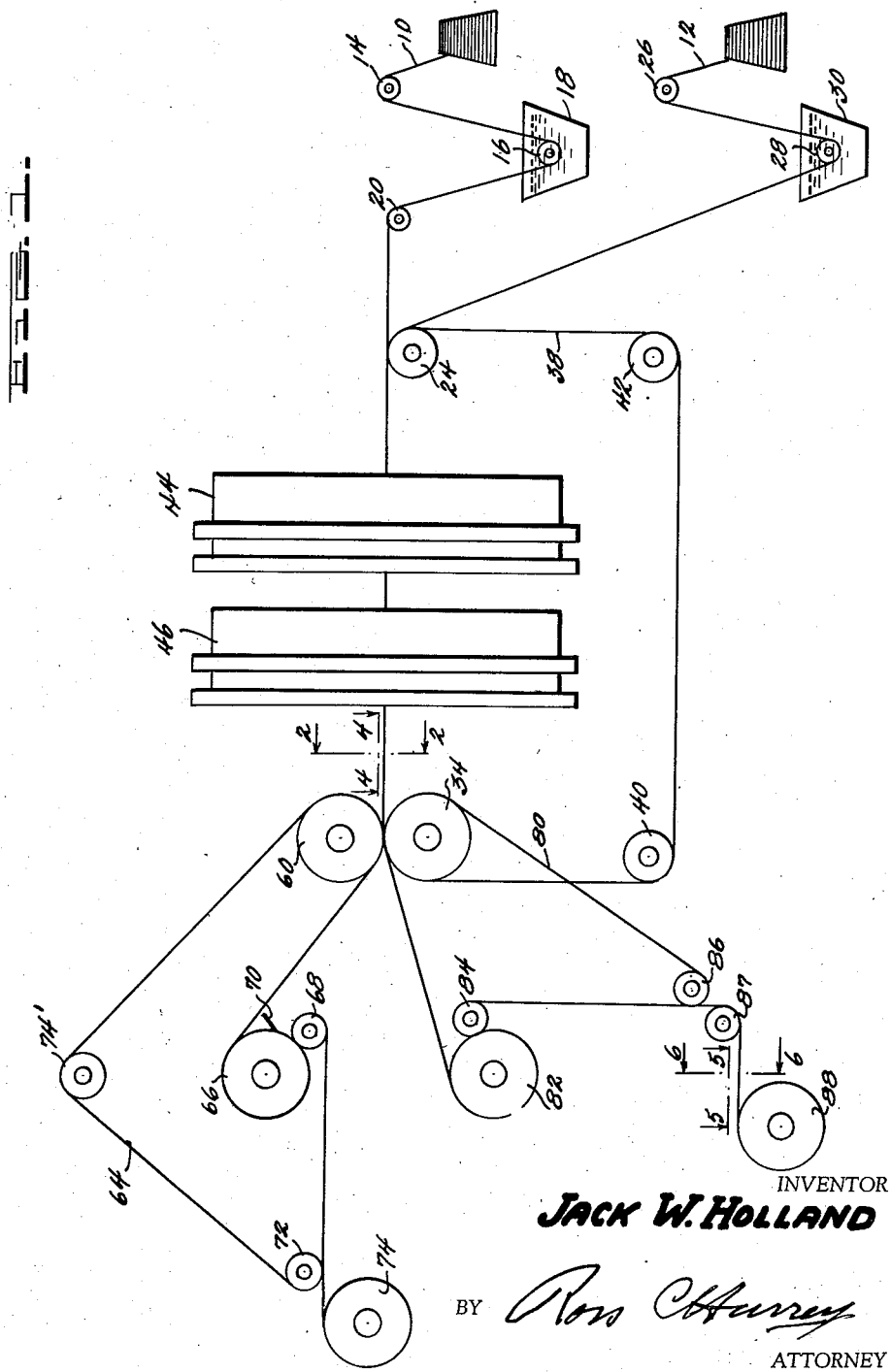
INVENTOR
JACK W. HOLLAND
BY *Ross C. Hurrey*
ATTORNEY Dec. 7, 1954     J. W. HOLLAND     2,696,243
METHOD AND APPARATUS FOR MAKING SCRIM
Filed Feb. 19, 1951     3 Sheets-Sheet 2
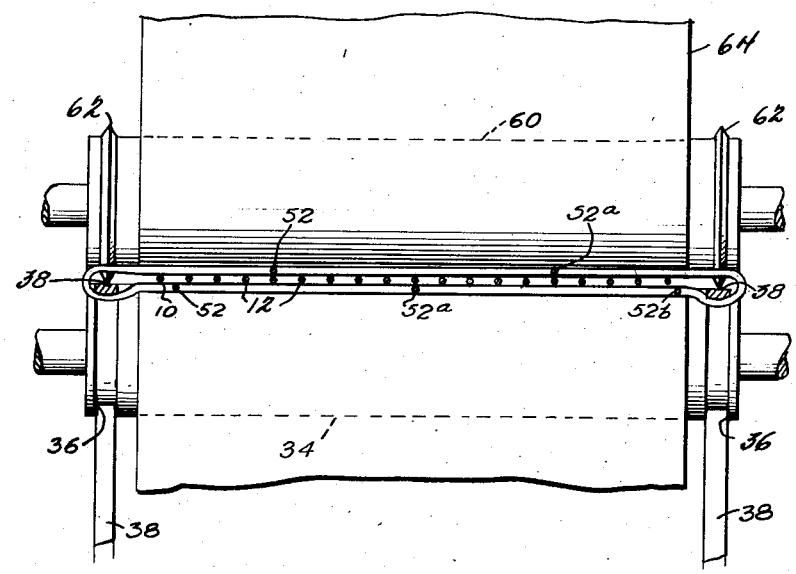
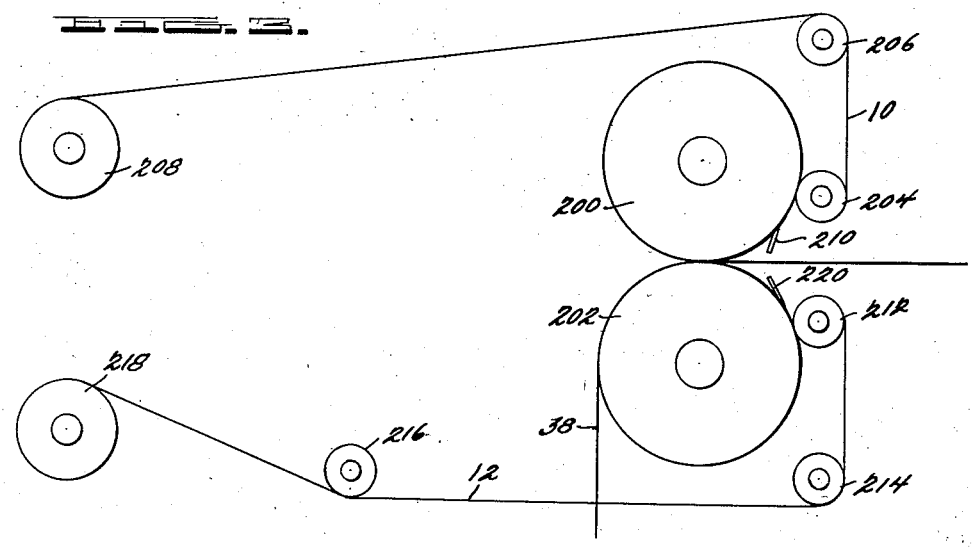
INVENTOR
JACK W. HOLLAND
BY
ATTORNEY Dec. 7, 1954 J. W. HOLLAND 2,696,243
METHOD AND APPARATUS FOR MAKING SCRIM
Filed Feb. 19, 1951 3 Sheets-Sheet 3
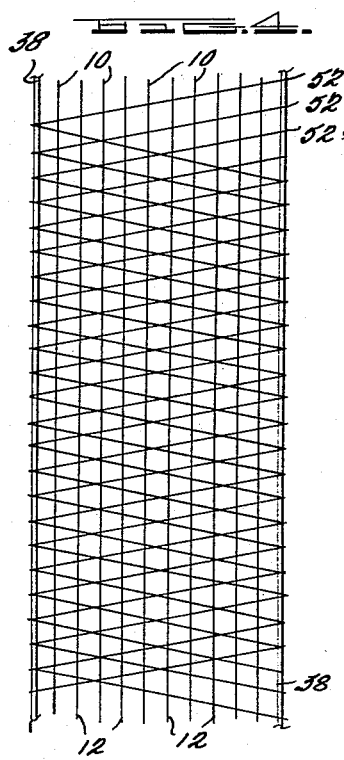
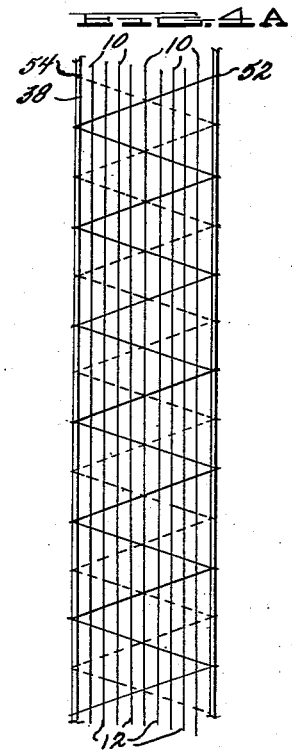
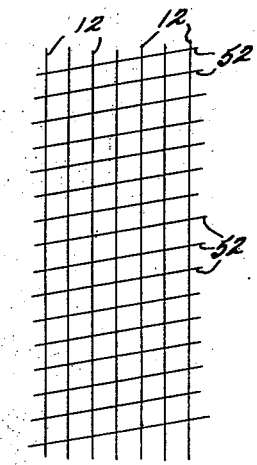
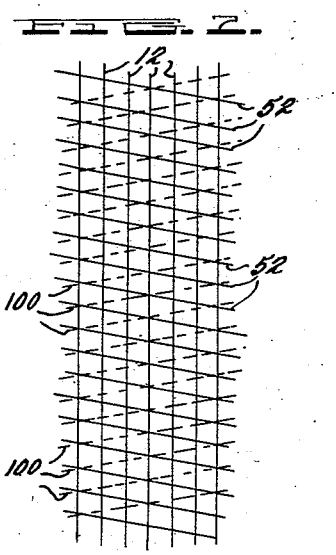
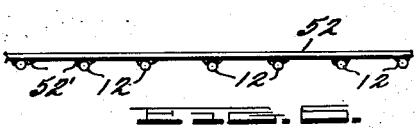
INVENTOR
JACK W. HOLLAND
BY
ATTORNEY

United States Patent Office 2,696,243
Patented Dec. 7, 1954

2,696,243

METHOD AND APPARATUS FOR MAKING SCRIM

Jack W. Holland, Hopatcong, N. J.

Application February 19, 1951, Serial No. 211,704

2 Claims. (Cl. 154—1.7)

It is an object of this invention to provide a novel and highly useful form of scrim.

It is a further object of this invention to provide a highly efficient method and apparatus for producing such scrim.

The above and other objects will be made clear from the following detailed description taken in connection with the annexed drawings, in which:

Figure 1 is a schematic elevation view of the improved apparatus;

Figure 2 is a view, partially in section, on the line 2—2 of Figure 1;

Figure 3 is a view similar to the left hand end of Figure 1 showing a different arrangement of combining and heating rolls;

Figure 4 is a view taken on the line 4—4 of Figure 1 showing the results of single turret operation;

Figure 4A is similar to Figure 4 but showing double turret operation;

Figures 5 and 6 are views taken respectively on the lines 5—5 and 6—6 of Figure 1 and illustrate the final product of single turret operation; and Figure 7 is similar to Figure 5 but shows the result of double turret operation.

For many packaging purposes laminations of diverse materials are desirable, and in such laminations, scrim, or coarse fabric forms a strength contributing ply. Since wide mesh fabric is difficult to control without the expense of forming knots at the intersection of weft and warp, it has been customary heretofore to form the mesh as part of the laminating process. The formation of the mesh, however, is relatively a slower process than the usual laminating job, and when this step is integrated with the laminating process it forms a limitation on the speed of the whole process.

The present invention contemplates a form of scrim which, though of coarse mesh, is nevertheless self-sustaining. It is preformed and can be fed into any laminating process just as readily and at the same speed as any of the other sheets making up the lamination. In the improved series, the warp threads are adhered to the weft threads, preferably by an adhesive which duplicates the ultimate intended laminating agent, but which must be at least compatible therewith. It will be understood that the terms warp and weft are used for convenience of reference. The scrim of the present invention is not "woven" in that the warp and weft threads are not interlaced, but merely intersect each other. As used herein, the term "warp" is applied to the longitudinal threads, those moving in the direction of the scrim formation, while the term "weft" is used to denote the threads extending transverse the direction of scrim formation.

Referring now to the drawings, and particularly to Figure 1, there is shown an upper supply of warp threads 10 and a lower supply of warp threads 12. It will be understood that as many spools of upper warp threads 10 and as many spools of lower warp threads 12 will be supplied as may be necessary to form the final scrim. The upper warps 10 pass over a roll 14 thence downward to a roll 16 immersed in a vat 18 of adhesive material preferably of the hot melt type such for example as asphalt. From the vat 18 the threads 10 pass over a roller 20 preferably in alinement with a roller 24. The lower warp threads 12 pass over a roller 26 thence downwardly around a roller 28 immersed in a vat 30 of adhesive material similar to that contained in the vat 18. From the roller 28 the lower warp threads 12 move upwardly to the roller 24.

From the roller 24 the upper warp threads 10 and the lower warp threads 12 proceed to a combining roll 34. The combining roll 34 has at its extremities grooves 36 (see Figure 2) which receive and guide a pair of flat metallic bands 38, which bands lie outside the threads 10 and 12. The return pass of the bands 38 is completed around rolls 40 and 42 which with the roll 24 are grooved in the same manner as the roll 34. A pair of circular, rotatable turrets 44 and 46 are provided and through these the bands 38 and warp threads 10 and 12 pass between rolls 24 and 34.

Each of the turrets is similar to those disclosed in applicant's prior Patent No. 2,542,139, dated February 20, 1951 and carries a plurality of spools of weft threads which, upon rotation of either turret, wrap themselves around the bands 38 and the warp threads 10 and 12. If at any one time either one but only one of the turrets is operated, it will lay a pattern of diagonal weft threads 52, 52a and 52b (see Figure 4). For the sake of simplicity only three weft threads are shown. In practice from 15 to 30 such threads would be used.

Figure 4A shows the result of using both turrets, rotating in opposite directions. Here, for the sake of simplicity only one weft thread from each turret is shown. The weft thread 52 is identical with the similarly identified thread of Figure 4. The thread 54 comes from the other turret, rotating in the direction opposite that of the turret supplying thread 52. As shown, the result is a crisscross pattern of diagonal weft threads above and below the mutually parallel warp threads 10 and 12.

Mounted above the roll 34 is a roll 60 having at its extremities circular cutters 62 which bear on the bands 38 and act to sever the end loops of the weft threads. Between the cutters 62 a belt 64 passes around the roll 60. The upper warp threads 10 serve to hold the severed weft threads against the belt 64 until the scrim and the belt 64 pass around a heated roller 66. An auxiliary roll 68 serves to assure a maximum wrap around the heated roll 66. The heat of the roll 66 melts or activates the adhesive coating on the warp threads 10. A doctor blade 70 bears on the roll 66 and prevents any build-up of adhesive material on the roll.

From the roll 68 the belt 64 and the scrim proceed to a roll 72 around which the belt 64 passes to an idler 74', thence back to upper roll 60. The span between rolls 68 and 72 is sufficient to permit the adhesive which has been melted or activated by the hot roll 66 to cool and set, thereby bonding the warp threads 10 to the weft threads. It is to be noted that the belt 64 contacts only the weft threads which act as spacers to prevent contact between the belt 64 and the warp threads 10. The belt 64 preferably has minimum transverse flexibility so that the possibility of contact between the belt 64 and the coated warp threads 10 is minimized.

The weft threads, being uncoated, do not tend to adhere to the belt 64. Accordingly the scrim is drawn by the warp threads 10 to a wind-up reel 74. It is to be noted that the warp threads 10 are continuous from the supply spools to the reel 74 and are constantly under control by tension. The weft threads are controlled by the bands 38 up to the cutters 62 and thereafter are controlled between the warp threads 10 and the belt 64.

Inasmuch as the turrets 44 and 46 impose a considerable tension on the weft threads it is important that these threads be not elastic for which reason the weft threads should preferably be formed of spun glass fibre. The invention, however, is not limited to such material.

The lower warp threads 12 pass over the lower combining roll 34 and hold the lower weft threads against a belt 80, thence around a heated roll 82, a guide roll 84 and another guide roll 86, whence the completed scrim goes around an idler 87 to a wind up reel 88 while the belt 80 proceeds back to the roll 34. The action here is identical with that taking place on the upper scrim with the rolls 60 and 66.

The warp threads 10 and 12 continuously advance in mutual parallelism and in a common plane between the guide roll 20 and the combining rolls 34 and 60. Beyond the nip of combining rolls 34 and 60 alternate sets of warp threads 10 and 12 are deployed out of the common plane and respectively follow the belts 64 and 80. Each set of warp threads carries with it consecutive weft threads which have been severed by the cutters 62. There are thus produced two independent webs of scrim.

In Figure 3 the bands 38 and the associated scrim pass between an upper combining roll 200 and a lower combining roll 202. The roll 200 will carry cutters similar to cutters 62, illustrated in Figure 2, which will bear on the bands 38 for severing the loops of the transverse threads. The bands 38 start their return pass around the roll 202 which pass is completed as described in connection with Figure 1.

The rolls 200 and 202 are of fairly large diameter, at least 24 inches, and are heated. The upper warp threads 10 carry their associated weft threads in contact with the roll 200 around most of the periphery of the roll to an idler roll 204 whence they pass over a second idler 206 to a wind up reel 208. A doctor 210 serves to remove any asphalt or other adhesive which may cling to the roll 200. In passing around this roll the adhesive on the warp threads 10 is softened so that these threads engage and adhere to the associated weft threads. In like manner the lower warp threads 12 with their associated weft threads pass around the lower heated roll 202 to an idler 212, thence around an idler 214, another idler 216 to a wind up reel 218. A doctor 220 keeps the roll 202 clean. In this construction no belts are required.

Figures 5 and 6 show warp threads 12 and weft threads 52 with the weft threads somewhat oblique to the warp threads which inevitably is the case due to forward movement of the scrim through one or more of the turrets. The warp and weft threads intersect and are sealed together as indicated at 52' (Figure 6). The weft threads are uncoated and the warp threads are coated with any suitable heat sealing compound. Asphalt is suggested as being the cheaper material for the purpose. Any hot melt, however, could be used and indeed any adhesive capable of being reactivated by heat could be used. If not of the hot melt type provision would have to be made between the spools and turrets for drying the adhesive.

Figure 7 shows the type of scrim produced by operating both turrets in opposite direction. Here are warp threads 12, weft threads 52 produced by one turret and weft threads 100 produced by the other turret.

While certain specific embodiments of the invention have been disclosed herein it is not intended to limit these to the precise details here disclosed but only as set forth in the subjoined claims, which are to be broadly construed.

I claim:

1. Apparatus for simultaneously forming two webs of scrim comprising: means for continuously advancing in parallelism in a common plane a plurality of warp threads coated with solidified thermoplastic material; means to loop around said warp threads a plurality of continuous weft threads whereby to superimpose a layer of weft threads on each side of said warp threads; means to sever the loops of the weft threads at each margin of the group of warp thread; means for deploying sets of alternate warp threads out of said common plane whereby to form two webs of scrim each comprising a set of warp threads in contact with a series of weft threads; means to press the warp and weft threads of each set together; means to heat each set while thus pressed to soften the solidified thermoplastic material, and means to cool the softened thermoplastic material to bond together the warp and weft threads of each set.

2. A method of making scrim comprising: coating a plurality of warp threads with thermoplastic material; solidifying said coating; continuously advancing said coated warp threads in mutual parallelism in a common plane; during such advance superimposing on each side of said warp threads a plurality of parallel, weft threads; continuing such advance while deploying sets of alternate warp threads out of said common plane whereby each set, with a group of superimposed weft threads, defines a scrim; continuing such advance while pressing the associated weft threads against each set of warp threads and heating the warp threads to soften said thermoplastic coatings and thereafter cooling said warp threads while still advancing the same whereby to perfect a bond between the warp and the weft threads of each set.

References Cited in the file of this patent

UNITED STATES PATENTS

| Number | Name | Date |
| --- | --- | --- |
| 939,839 | Himes | Nov. 9, 1909 |
| 1,195,949 | Carney | Aug. 22, 1916 |
| 1,195,951 | Carney | Aug. 22, 1916 |
| 2,015,006 | Ekisler | Sept. 17, 1935 |
| 2,266,761 | Jackson et al. | Dec. 23, 1941 |
| 2,475,019 | Faris | July 5, 1949 |
| 2,502,514 | Ewer | Apr. 4, 1950 |
| 2,522,527 | Manning | Sept. 19, 1950 |
| 2,542,139 | Holland | Feb. 20, 1951 |

FOREIGN PATENTS

| Number | Country | Date |
| --- | --- | --- |
| 17,549 | Great Britain | of 1898 |
| 13,430 | Great Britain | Feb. 4, 1909 |